Figure 1:
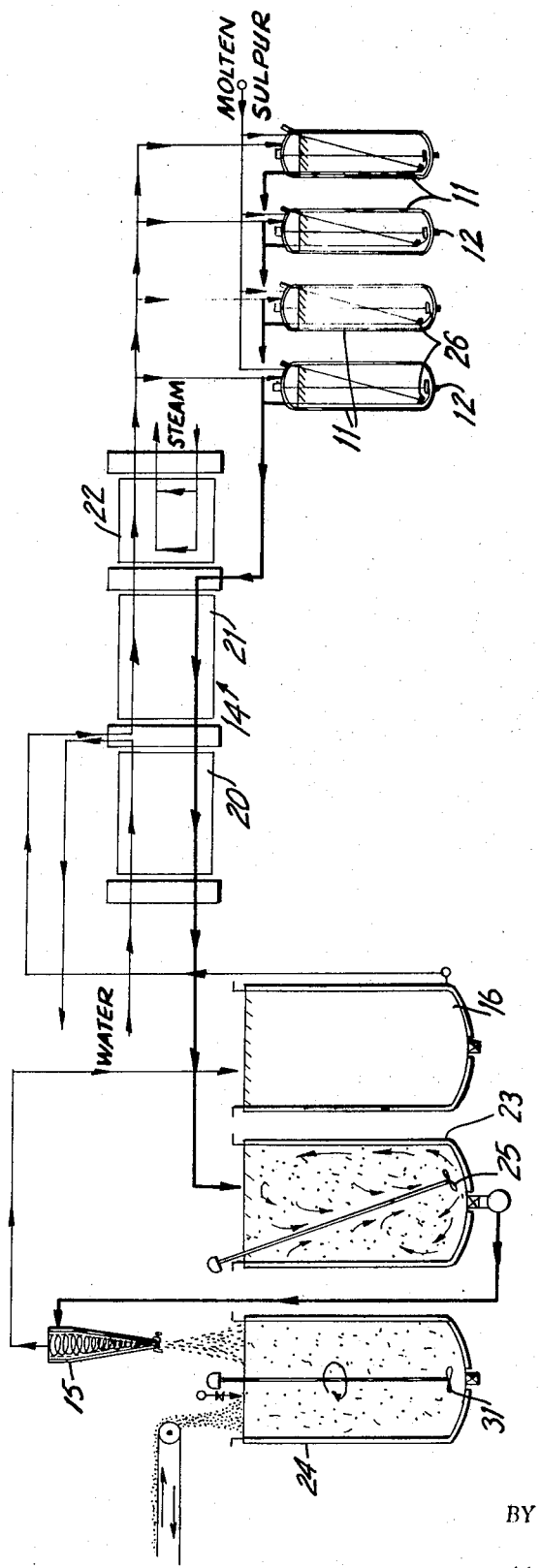

ns Patent [15] 3,679,269
Elliott [45] *July 25, 1972

[54] TRANSPORT OF SULPHUR

[72] Inventor: Herbert James Elliott, Bradford-on-Avon, England

[73] Assignee: Elliott Associated Developments Limited, London, England

[ * ] Notice: The portion of the term of this patent subsequent to Nov. 4, 1986, has been disclaimed.

[22] Filed: March 21, 1969

[21] Appl. No.: 832,519

Related U.S. Application Data

[62] Division of Ser. No. 659,386, Aug. 9, 1967, Pat. No. 3,476,441.

[52] U.S. Cl. .............................................................. 302/14
[51] Int. Cl. ........................................................... B65g 53/30
[58] Field of Search ............................................. 302/14, 66

[56] References Cited

UNITED STATES PATENTS

| | | | |
|---|---|---|---|
| 2,947,578 | 8/1960 | Corneil et al. | 302/66 |
| 2,798,772 | 7/1957 | Redcay | 302/14 |
| 3,443,837 | 5/1969 | Meyer et al. | 302/14 |

Primary Examiner—Evon C. Blunk
Assistant Examiner—Hadd S. Lane
Attorney—Dowell and Dowell

[57] ABSTRACT

This invention relates to the preparation of sulphur for transport through a pipeline in a carrier liquid in which molten sulphur is introduced into a light oil fraction. There are means for cooling the sulphur-loaded oil and precipitating the sulphur from the oil. A blending vessel is provided which mixes the precipitated sulphur with the carrier liquid and the sulphur-loaded oil from the mixing vessel is passed to a countercurrent heat exchange with the separated oil returning to the vessel.

5 Claims, 2 Drawing Figures

TRANSPORT OF SULPHUR

This application is a division of U.S. Ser. No. 659,386, filed Aug. 9, 1967 for the same inventor, now U.S. Pat. No. 3,476,441.

This invention relates to the transport of sulphur, more particularly in pipe lines.

A proposal has been made for the transport of sulphur over long distances by pipe line in the solid state using as a carrier liquid crude oil and condensates. For this purpose the sulphur is finely ground so that a slurry of sulphur in the oil can be formed. It is an object of the invention to provide a scheme which is more advantageous than this prior proposal.

According to the present invention, sulphur particles for pipe line transport are produced by precipitation, and/or by dispersion of molten sulphur, in a liquid medium instead of by mechanical reduction.

In one technique, the sulphur is treated, in preparation for pipe line transport, by introducing it in the molten state into a liquid, e.g. a comparatively light oil fraction such as diesoline, which is a solvent therefor. The result is a sulphur/solvent mixture which contains a higher or lower proportion of dissolved sulphur according to the temperature of the oil, the remaining sulphur being contained in the oil as solid in a finely dispersed condition. Either dissolved or in finely divided solid form the sulphur is in a state suitable for pipeline transport. Preferably, however, the sulphur is separated in finely divided form from the bulk of the solvent and introduced into a carrier liquid such as crude oil prior to transport. In the case of the dissolved sulphur cooling of the solvent oil causes it to form a precipitate which can then be separated, for example by centrifuging.

In another technique, the molten sulphur is pelletized or granulated by the process described in our patent application Ser. No. 48,828/64 except that fine pressurized sulphur nozzles are used, the cooling liquid employed in the pelletizing vessel is a solvent oil instead of water and the impeller in the vessel rotates in the opposite direction to the swirl created by the peripheral jets. This produces much finer particles.

As a preferred feature of the invention, sulphur particles of different sizes produced by both the techniques above are blended upon introduction into the pipe line carrier liquid.

These techniques avoid access of moisture to the sulphur and give close control over the blend of particle sizes transported so that an optimum economic mixture with the carrier liquid is readily obtainable. Furthermore, whereas it is common for impurities to find their way into material that is mechanically reduced, e.g. in a ball mill, the absence of mechanical reduction in the techniques according to the invention avoids contamination of the sulphur and results in a particulate product being transported which can be recovered more easily in a pure state from the carrier liquid after transport. A material reduction in the capital and running costs of the recovery plant is thereby achieved.

Figure 2:
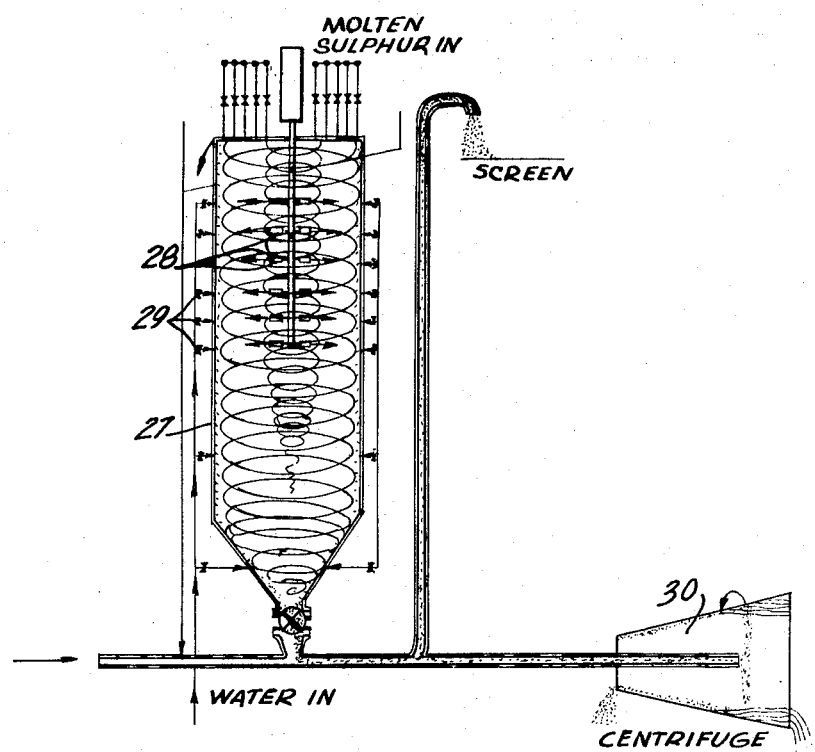

One particular example of how the invention may be practised will now be described with reference to the accompanying drawings, in which:

FIG. 1 is a diagram of plant for producing a mixture of sulphur finely dispersed in oil and for blending in further sulphur particles, and FIG. 2 illustrates the production of those further sulphur particles.

Referring firstly to FIG. 1, molten sulphur at about 128°C is delivered into each of four steam-jacketed solvent mix tanks 11 grouped in parallel with one another and containing diesoline maintained at 125°–128° C. Each of the mix tanks has an agitator 26. From here the resulting oil/sulphur mixture is pumped by means of submerged centrifugal pumps 12 through two stages 20, 21 of a three-stage countercurrent heat exchanger 14. In the middle stage 21 of the heat exchanger the oil/sulphur mixture is passed in heat exchange with diesoline returning to the tanks 11 after having been stripped of its sulphur, while in the coldest stage 20 the oil/sulphur mixture is further cooled by heat exchange with cooling water. The returning diesoline has a temperature at entry to the middle stage 21 of the heat exchanger of about 20° C. to 30° C., and after heat exchange with the sulphur/oil mixture it passes through the third or hottest stage 22 of the heat exchanger, which is steam-heated, where it is further heated to a temperature of about 128° C. by the time it leaves the heat exchanger.

As a result of the cooling, sulphur which has been dissolved in the hot oil is precipitated in more or less finely divided form. The cooled mixture is delivered into a precipitation vessel 23 fitted with a cooling jacket and from the bottom of the vessel 23 the oil and precipitate is pumped to a hydrocyclene or Super-D-Canter Sharples centrifuge 15 where the sulphur is stripped from the major proportion of the oil. The stripped diesoline passes from the hydrocyclone 15 into a tank 16 at 20°–30 C. whence it is pumped back via the heat exchanger 14 to the tanks 11. The tank 16 may be fitted with a cooling or heating jacket, as desired, to obtain the correct heat balance in the plant. The concentrated sulphur precipitate from the hydrocyclone or centrifuge 15 is delivered into a blending tank 24.

The solubility of the sulphur in the oil is about 10 percent by weight at 128° C. Bearing this in mind, a suitable ratio of oil to sulphur is 15: 1. Visible precipitation commences at about 50° C. The precipitation vessel 23 may be equipped with an agitator 25.

The heat exchanger 14 is preferably a De Laval plate heat exchanger; these have corrugated plates so that fluid flowing through is caused to follow a sinuous path, which may be beneficial for conditioning the precipitating sulphur.

As an alternative, the oil in the solvent mix tanks may be maintained at a considerably lower temperature, say in the range 20°–50° C., the sulphur being dispersed in the oil in a finely divided solid state rather than being dissolved in the oil. For this purpose the molten sulphur is fed in streams through fine jets into the oil so as to obtain a high degree of dispersion. Strong agitation is needed. The same ratio of oil to sulphur, i.e. 15 to 1, may be used as before.

A second sulphur stream is treated in a pelletizing vessel 27 (FIG. 2). The general principle of operation of this vessel is similar to that described in our patent application Ser. No. 48,828/64 but it has some important modifications. One is that the cooling liquid in the vessel is not a liquid entirely immiscible with molten sulphur, such as water, but is again an oil such as diesoline in which sulphur is soluble to an increasing extent with rising temperature. Another modification is that the nozzles for delivering the molten sulphur streams downward into the body of cooling liquid are finer than those employed in the prior patent application and are pressurized, being generally similar to those used in prill towers. Yet another, and extremely important, change is that a multi-disc rotary impeller 28 is provided in the vessel 27 which impeller rotates in the opposite direction to swirl induced in the liquid in the vessel by means of tangentially discharging peripheral oil jets 29. The object is to create shear at the region where the liquid dragged round by the impeller encounters the oppositely-directed swirl due to the jets, thereby to produce a tendency for the solidifying sulphur droplets in the liquid to break down to a finer sizing. The diameter of the impeller discs should be approximately one third that of the vessel.

The result is that the pelletizing vessel 27 produces unusually small-sized pellets or granules and these are delivered from the bottom of the vessel in a stream of the oil to a centrifuge 30 where they are separated from the major proportion of the oil. The pellets or granules separated by the centrifuge 30 are fed to the aforementioned blending tank 24 (FIG. 1), while the stripped diesoline is recycled. If desired, overflows from the pelletizing vessel, containing fines, may also be delivered to the centrifuge. And the pellet-bearing stream from the bottom of the vessel may be passed to a screen, for example a wedge wire screen, instead of directly to the centrifuge, oversize pellets being removed and only the screen underflow then reaching the centrifuge.

In the blending vessel 24, which has an agitator 31 and may also be fitted with a heating or cooling jacket, the sulphur particles from the precipitation vessel on the one hand, and from the pelletizing vessel on the other hand, are both mixed into the carrier liquid, e.g. crude oil, which is to transport the sulphur through the pipe line. The flows of the two types of sulphur particles are mutually proportioned so as to achieve the optimum blend for pipe line transport, and the flow of the carrier liquid is likewise regulated to obtain the optimum density of sulphur particles therein.

Many modifications of the process are possible without departing from the scope of the invention. Thus whereas as described two types of sulphur particles produced by different techniques are blended, one could operate with only one type or the other. And there are other ways of obtaining the sulphur particles, such as pelletizing in water with a silicone fluid additive under alkaline conditions (pH say 8), or reacting hydrogen sulphide chemically to produce a colloidal sulphur precipitate in alkaling solution. In these last two cases the mixture of sulphur particles and alkaline liquid can be centrifuged and the sulphur then passed through a treatment in diesoline at above 100°C., for example, to get rid of the water content ready for the pipe line. The purpose of pelletizing in alkaline water is to enable discrete pellets to be produced at a higher temperature than would otherwise be the case.

Whereas an oil fraction, such as diesoline, will normally be the most convenient liquid to employ, it will be understood that other liquids also act as solvents for sulphur and the invention is to be considered as extending to the use of such other solvents.

What is claimed is:

1. Apparatus for preparing sulphur for transport by pipeline in a carrier liquid comprising at least one mixing vessel for introducing molten sulphur into a light oil fraction, cooling means for cooling the sulphur-loaded oil from said vessel and precipitating the sulphur therefrom, means for separating the precipitated sulphur from the oil, a blending vessel for mixing the precipitated sulphur with a carrier liquid for transport, and means for passing the sulphur-loaded oil from the mixing vessel into counter-current heat exchange with separated oil returning to said vessel.

2. Apparatus according to claim 1 wherein the heat exchanger is a plate type heat exchanger.

3. Apparatus according to claim 1 wherein the separating means comprises a centrifuge.

4. Apparatus according to claim 1 including a pelletizing vessel wherein molten sulphur streams are introduced into a cooling liquid through pressurized nozzles and are converted into sulphur pellets of small size for delivery into the blending vessel.

5. Apparatus according to claim 4, wherein the pelletizing vessel has peripheral jets for introducing cooling liquid substantially tangentially to create a swirl, and impeller means rotating in the opposite direction to said swirl.

* * * * *